(12) United States Patent
Yamauchi

(10) Patent No.: US 7,626,639 B2
(45) Date of Patent: Dec. 1, 2009

(54) METHOD AND APPARATUS FOR DETECTING NOISE IN MOVING PICTURE

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 769 days.

(21) Appl. No.: 11/313,646

(22) Filed: Dec. 22, 2005

(65) Prior Publication Data

US 2006/0158561 A1 Jul. 20, 2006

(30) Foreign Application Priority Data

Dec. 27, 2004 (JP) ............... 2004-377572

(51) Int. Cl.
  *H04N 5/21* (2006.01)
  *H04N 5/14* (2006.01)
(52) U.S. Cl. .................. 348/607; 348/620; 348/672
(58) Field of Classification Search ................. 348/607, 348/614, 672, 624, 620–622; 382/168, 172; *H04N 5/21, H04N 5/14*
See application file for complete search history.

(56) References Cited

U.S. PATENT DOCUMENTS 5,949,916 A * 9/1999 Chun .......................... 348/607
6,373,533 B1 * 4/2002 Kawabata et al. ........... 348/672
7,068,328 B1 * 6/2006 Mino ......................... 348/672
2006/0192693 A1 * 8/2006 Yamauchi .................... 341/50

FOREIGN PATENT DOCUMENTS

| JP | 2-233089 | 9/1990 |
|---|---|---|
| JP | 8-98060 | 4/1996 |
| JP | 10-75386 | 3/1998 |
| JP | 2001-346228 | 12/2001 |
| JP | 2002-10105 | 1/2002 |

\* cited by examiner

*Primary Examiner*—Sherrie Hsia
(74) *Attorney, Agent, or Firm*—Finnegan, Henderson, Farabow, Garrett & Dunner, L.L.P.

(57) ABSTRACT

An image processing apparatus includes a difference generation section and a histogram generation section. The difference generation section generates picture differences between frames of a moving picture in units of pixels, based on a present signal of the moving picture and a noise-eliminated frame-delayed signal acquired by subjecting the present signal to a process of eliminating noise and a process of delaying the present signal by one frame. The histogram generation section generates a histogram indicating a level distribution of part of the generated picture differences from which picture differences corresponding to pixels where a picture change not less than a threshold occurs are excluded.

10 Claims, 6 Drawing Sheets

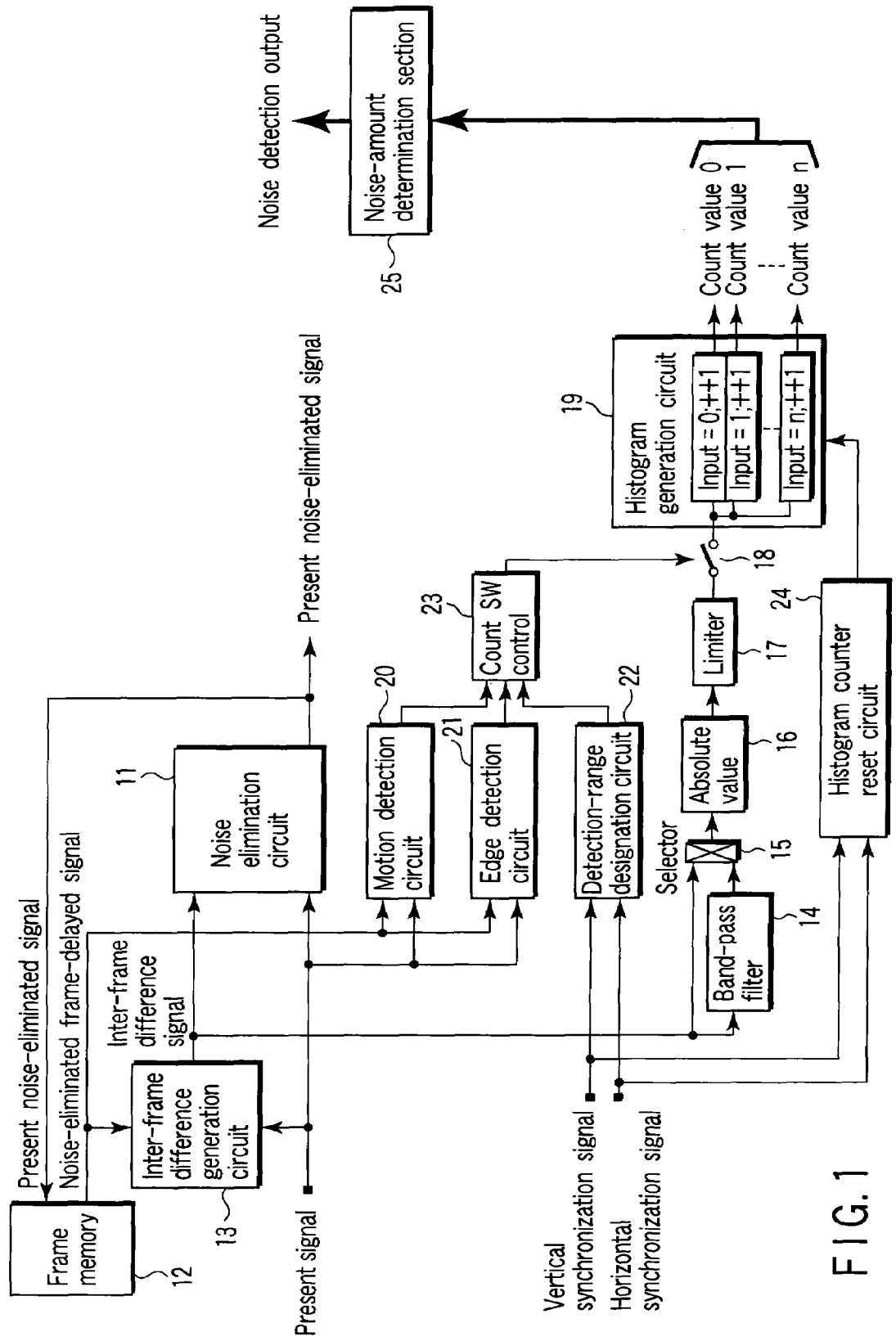
F I G. 1

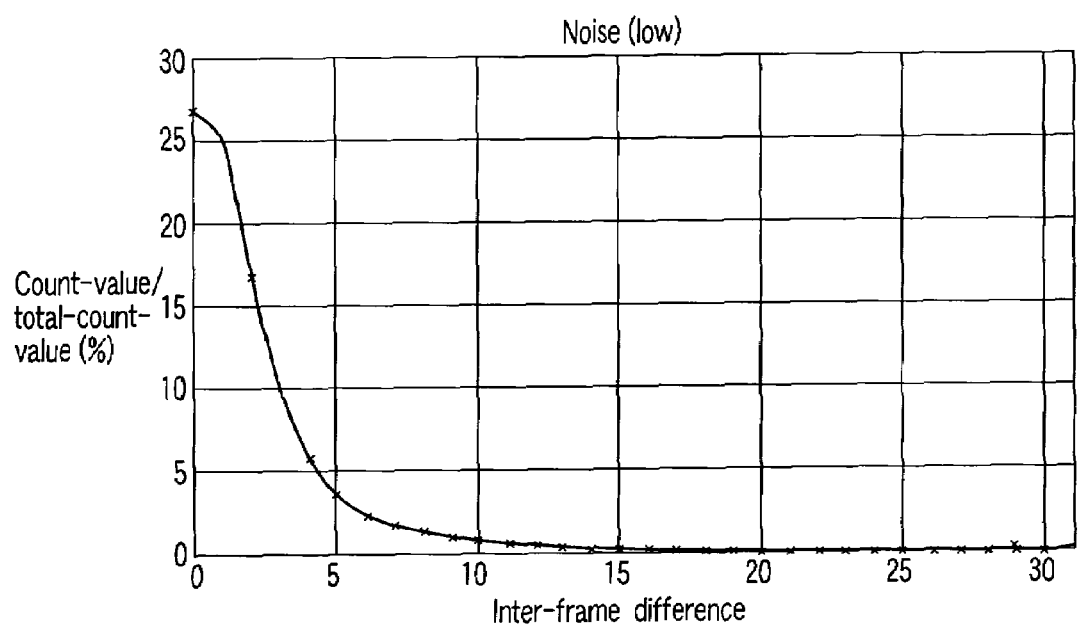
F I G. 6

METHOD AND APPARATUS FOR DETECTING NOISE IN MOVING PICTURE

CROSS-REFERENCE TO RELATED APPLICATIONS

This application is based upon and claims the benefit of priority from prior Japanese Patent Application No. 2004-377572, filed Dec. 27, 2004, the entire contents of which are incorporated herein by reference.

BACKGROUND OF THE INVENTION

1. Field of the Invention

The present invention relates to an image processing apparatus capable of detecting noise contained in a moving picture, and an image processing method for use in the apparatus.

2. Description of the Related Art

Apparatuses, such as digital TV receivers, employ various methods for detecting noise contained in moving pictures.

Jpn. Pat. Appln. KOKAI Publication No. 2001-346228, for example, discloses a technique for computing the absolute value of the difference between the values of each pair of corresponding portions of continuous fields or frames included in a video signal, thereby accumulating a predetermined number of absolute values to extract a value corresponding to noise.

Further, Jpn. Pat. Appln. KOKAI Publication No. 2-233089 discloses a technique for acquiring the difference between image signals, squaring the difference, averaging the result and acquiring the square root of the average, thereby detecting random noise containing no fixed pattern noise.

However, in the conventional techniques, noise detection is influenced by a change in picture between frames, with the result that accurate noise detection cannot be achieved.

Under the circumstances, there is a demand for a technique for accurately detecting noise contained in a moving picture signal.

BRIEF SUMMARY OF THE INVENTION

According to one aspect of the present invention, there is provided an image processing apparatus, comprising a difference generation section which generates picture differences between frames of a moving picture in units of pixels, based on a present signal of the moving picture and a noise-eliminated frame-delayed signal acquired by subjecting the present signal to a process of eliminating noise and a process of delaying the present signal by one frame, and a histogram generation section which generates a histogram indicating a level distribution of part of the generated picture differences from which picture differences corresponding to pixels where a picture change not less than a threshold occurs are excluded.

According to another aspect of the present invention, there is provided an image processing method, comprising generating picture differences between frames of a moving picture in units of pixels, based on a present signal of the moving picture and a noise-eliminated frame-delayed signal acquired by subjecting the present signal to a process of eliminating noise and a process of delaying the present signal by one frame, and generating a histogram indicating a level distribution of part of the generated picture differences from which picture differences corresponding to pixels where a picture change not less than a threshold occurs are excluded.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of an image processing apparatus according to a first embodiment of the invention;

FIG. 6 is an example of a histogram acquired when low-level noise is detected;

DETAILED DESCRIPTION OF THE INVENTION

Figure 2:
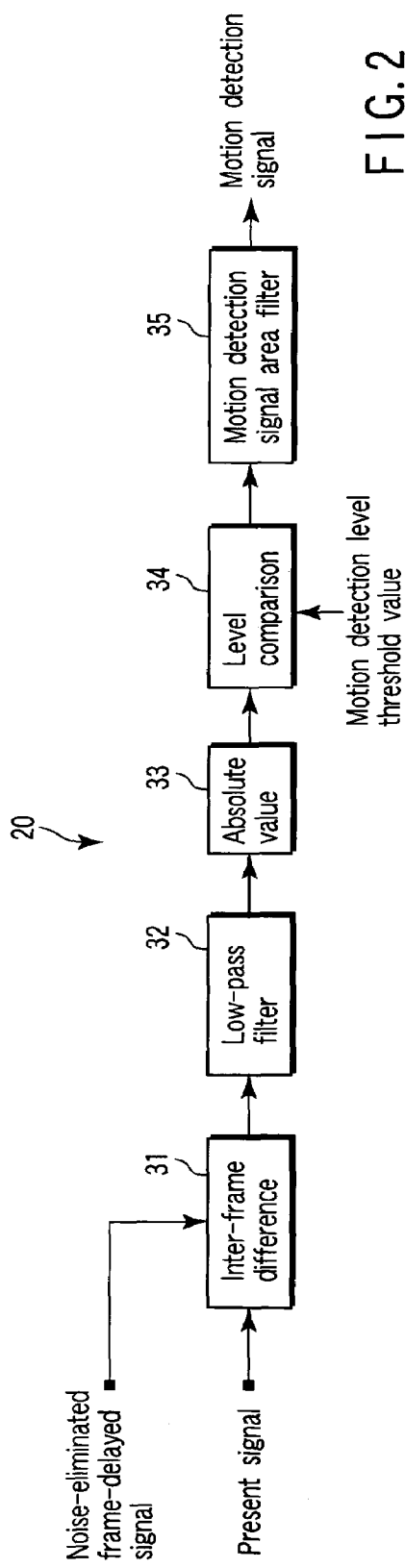
FIG. 2 is a block diagram illustrating the configuration of the motion detection circuit appearing in FIG. 1.

Embodiments of the present invention will be described below with reference to the drawings.

FIG. 1 is a block diagram illustrating an image processing apparatus according to a first embodiment of the invention.

The image processing apparatus is installed in, for example, a digital TV receiver or record/playback machine, and can be realized by, for example, an LSI. The image processing apparatus has a function for detecting noise contained in a signal corresponding to the effective image range (the range of displaying, for example, video data to be seen by users) of digital moving picture data transmitted.

In the first embodiment, the image processing apparatus generates picture differences between frames of a moving picture in units of pixels, based on a present signal of the moving picture and a noise-eliminated frame-delayed signal acquired by subjecting the present signal to a process of eliminating noise and a process of delaying the present signal by one frame. Furthermore, the image processing apparatus generates a histogram indicating a level distribution of part of the generated picture differences from which picture differences corresponding to pixels where a picture change not less than a threshold occurs are excluded.

The image processing apparatus includes a noise elimination circuit 11, frame memory 12, inter-frame difference generating circuit 13, band-pass filter 14, selector 15, absolute-value generation circuit 16, limiter 17, switch 18 and histogram generation circuit 19, a motion detection circuit 20, edge detection circuit 21, detection-range designation circuit 22, count switch (SW) control circuit 23, histogram counter reset circuit 24 and noise-amount determination section 25.

The noise elimination circuit 11 employs a scheme called a frame circulation type. It subjects a present signal of a moving picture to a noise elimination process, while acquiring a noise-eliminated frame-delayed signal, described later. As a result, a present noise-eliminated signal is generated and sent to the frame memory 12.

The frame memory 12 temporarily stores the present noise-eliminated signal generated by the noise elimination circuit 11, and outputs the stored signal as a noise-eliminated frame-delayed signal after a time period corresponding to one frame elapses. This noise-eliminated frame-delayed signal is sent to the inter-frame difference generating circuit 13, motion detection circuit 20 and edge detection circuit 21.

The inter-frame difference generating circuit 13 generates, in units of pixels, an inter-frame difference signal indicating the signal-level difference between frames, based on the present signal of the moving picture and the noise-eliminated frame-delayed signal. For instance, in a pixel where a picture change (e.g., signal-level change) not less than a threshold occurs between frames, the inter-frame difference signal contains a component due to the picture change, as well as a noise component. The generated inter-frame difference signal is sent to the noise elimination circuit 11, band-pass filter 14 and selector 15.

The band-pass filter 14 eliminates a DC component from the inter-frame difference signal generated by the inter-frame difference generating circuit 13. By eliminating the DC component, a component due to a slight change in picture that cannot be detected even by motion detection, described later, can be detected.

The selector 15 is used to select one of the inter-frame difference signal that has been processed by the band-pass filter 14 and the inter-frame difference signal that is not processed by the filter 14 so as to sent the selected signal to the absolute-value generation circuit 16. The selector 15 may not be used, and the band-pass filter 14 may be always used instead. Alternatively, none of the selector 15 and band-pass filter 14 may be used.

The absolute-value generation circuit 16 generates an inter-frame difference absolute-value signal indicating the absolute value of the difference in signal level between frames.

The limiter 17 limits passing of signal components of a certain level or more, which are not necessary for the generation of a histogram, described later, and are contained in the inter-frame difference absolute-value signal generated by the absolute-value generation circuit 16, thereby generating an inter-frame difference histogram input signal. The inter-frame difference histogram input signal indicates the difference signal level of each pixel. Note that the limiter 17 is not always needed.

The switch 18 is controlled by the count SW control circuit 23 to switching on and off the input of an inter-frame difference histogram input signal to the histogram generation circuit 19.

The histogram generation circuit 19 has a plurality of counters for counting the number of pixels, which correspond to respective difference signal levels. When the switch 18 is closed, the histogram generation circuit 19 receives an inter-frame difference histogram input signal, thereby acquiring the difference signal level of each pixel, and counting the number of pixels corresponding to each of the acquired difference signal levels. As a result, a histogram indicating the difference level distribution is generated. Alternatively, a single counter may be used and constructed to count the number of pixels corresponding to a predetermined level range including a plurality of levels. The count results of the counters are sent to the noise-amount determination section 25. Before sending the count result data to the section 25, it may be compressed or thinned out.

The motion detection circuit 20 detects a pixel where a signal-level change between frames is not less than a certain value (i.e., threshold), and outputs the detection result as a motion detection signal.

The edge detection circuit 21 detects a pixel that has a signal-level difference not less than a certain value (i.e., threshold) with respect to adjacent pixels, and outputs the detection result as an edge detection signal.

The detection-range designation circuit 22 receives vertical and horizontal synchronization signals, and outputs a range designation signal indicating a range (e.g., effective image range) used for generating a histogram. The detection-range designation circuit 22 can spatially thin out pixels used for generating a histogram.

The count SW control circuit 23 sets the target range for histogram generation to the range designated by the detection-range designation circuit 22, and controls the switch 18 so as to exclude, from the targets for histogram generation, the differences corresponding to the pixels detected by the motion detection circuit 20 and edge detection circuit 21. More specifically, when no motion detection signal or no edge detection signal is input, the count SW control circuit 23 keeps the switch 18 closed. However, when at least one of these signals is input, the circuit 23 keeps the switch 18 open, thereby inhibiting counting of the pixels contained in the range designated by the detection-range designation circuit 22. As a result, difference information concerning the pixels where there is no significant signal-level change between frames is acquired.

The histogram counter reset circuit 24 receives vertical and horizontal synchronization signals, and resets each counter of the histogram generation circuit 19 in synchronism with the output timing of a histogram from each counter. In this embodiment, reset is performed whenever each frame is processed. However, one resetting process may be performed whenever a certain number of frames are processed. In this case, since each counter of the histogram generation circuit 19 performs counting over the certain number of frames, a histogram in which data is integrated over the certain number of frames is generated.

The noise-amount determination section 25 determines the amount of noise contained in the moving picture, based on the histogram generated by the histogram generation circuit 19. Specifically, the amount of noise can be determined using at least the standard deviation, variance or mean of the level distribution indicated by a histogram. The determination result can be used to adjust various parameters (for, e.g., determining the highlighting degree of the outline of an image) related to the control of a moving picture. The noise-amount determination section 25 may determine the amount of noise after it performs an integration process of acquiring a histogram.

In the image processing apparatus constructed as above, a noise-eliminated frame-delayed signal is generated by subjecting a present signal of a moving picture to a noise elimination process and a process of delaying the signal by one frame. Based on the present signal and the noise-eliminated frame-delayed signal, an inter-frame difference signal is generated. The inter-frame difference signal is subjected to various necessary processes, and then sent as an inter-frame difference histogram input signal to the histogram generation circuit 19. On the other hand, motion detection and edge detection are performed based on the present signal and noise-eliminated frame-delayed signal, thereby inhibiting the supply of a signal corresponding to pictures detected by these detection processes to the histogram generation circuit 19. As a result, a histogram is generated with unnecessary components due to, for example, a picture change between frames or pixels eliminated, and hence the amount of noise in the moving picture can be accurately determined.

Referring now to FIG. 2, the motion detection circuit 20 will be described in more detail.

The motion detection circuit 20 includes, for example, an inter-frame difference generation circuit 31, low-pass filter 32, absolute-value generation circuit 33, level comparison circuit 34 and motion detection signal area filter 35.

The inter-frame difference generation circuit 31 generates, in units of pixels, an inter-frame difference signal indicating a picture difference (e.g., signal-level difference for each pixel) between frames, based on a present signal and noise-eliminated frame-delayed signal. Instead of providing the inter-frame difference generation circuit 31, the output signal of the inter-frame difference generation circuit 13 in FIG. 1, which has the same function as the circuit 31, may be directly supplied to the low-pass filter 32, described below.

The low-pass filter 32 eliminates a noise component from the inter-frame difference signal generated by the inter-frame difference generation circuit 31, thereby generating a low-band inter-frame difference signal. By eliminating the noise component, a signal that further accurately reflects a picture change between frames can be acquired.

The absolute-value generation circuit 33 generates a low-band inter-frame difference absolute-value signal indicating the absolute value of the difference indicated by the low-band inter-frame difference signal generated by the low-pass filter 32.

The level comparison circuit 34 detects a pixel where the level of the low-band inter-frame difference absolute-value signal generated by the absolute-value generation circuit 33 is not less than a motion detection level threshold, and generates a signal indicating the detection result.

The motion detection signal area filter 35 amplifies the level of each pixel where the level of the low-band inter-frame difference absolute-value signal is not less than the motion detection level threshold, and outputs the amplified level as a motion detection signal. This amplification process may be performed only in the horizontal direction, or in both the horizontal and vertical directions.

By virtue of the above structure, a detection result indicating a pixel where a signal-level change between frames is not less than a certain value (i.e., threshold) can be acquired as a motion detection signal.

Figure 3:
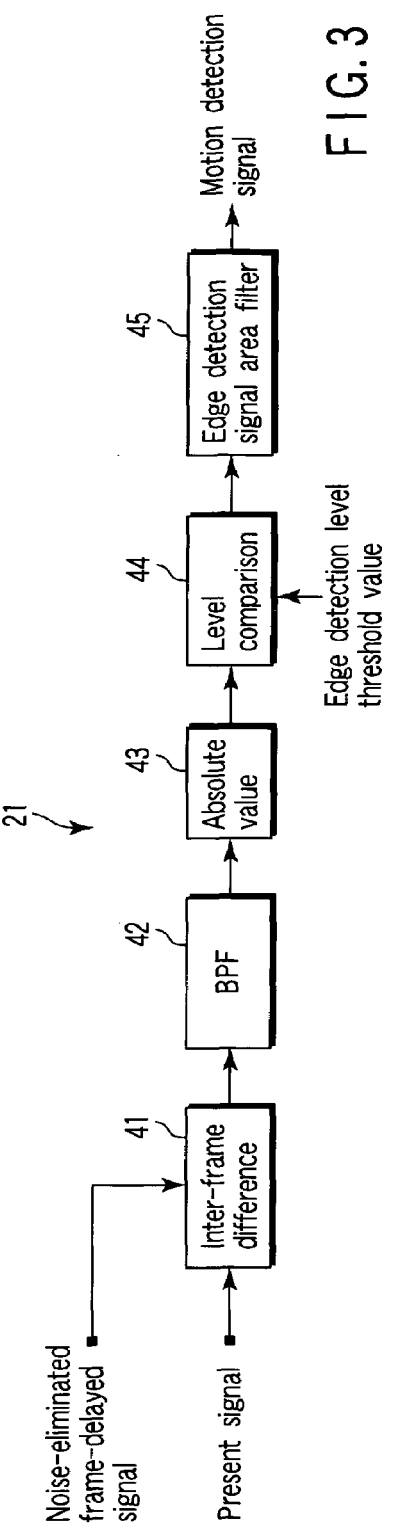
FIG. 3 is a block diagram illustrating the configuration of the edge detection circuit appearing in FIG. 1.

Referring to FIG. 3, the edge detection circuit 21 will be described in more detail.

The edge detection circuit 21 includes, for example, an inter-frame difference generation circuit 41, band-pass filter 42, absolute-value generation circuit 43, level comparison circuit 44 and edge detection signal area filter 45.

The inter-frame difference generation circuit 41 generates, in units of pixels, an inter-frame difference signal indicating the signal-level difference between frames, based on a present signal and noise-eliminated frame-delayed signal. The inter-frame difference generation circuit 41 may be omitted.

The band-pass filter 42 generates an inter-pixel difference signal indicating the difference in signal level between adjacent pixels, based on the present signal or the difference signal generated by the inter-frame difference generation circuit 41. By this filtering, a signal corresponding to an edge of a picture can be acquired. This process may be performed only in the horizontal direction, or in both the horizontal and vertical directions.

The absolute-value generation circuit 43 generates an inter-pixel difference absolute-value signal indicating the absolute value of the difference indicated by the inter-pixel difference signal generated by the band-pass filter 42.

The level comparison circuit 44 detects a pixel where the level of the inter-pixel difference absolute-value signal generated by the absolute-value generation circuit 43 is not less than an edge detection level threshold, and generates a signal indicating the detection result.

The edge detection signal area filter 45 amplifies the level of each pixel where the level of inter-pixel difference absolute-value signal is not less than the edge detection level threshold, and outputs the amplified level as an edge detection signal. This amplification process may be performed only in the horizontal direction, or in both the horizontal and vertical directions.

By virtue of the above structure, a detection result indicating a pixel that has a signal-level difference not less than a certain value (i.e., threshold) with respect to adjacent pixels can be acquired as an edge detection signal.

Figure 4:
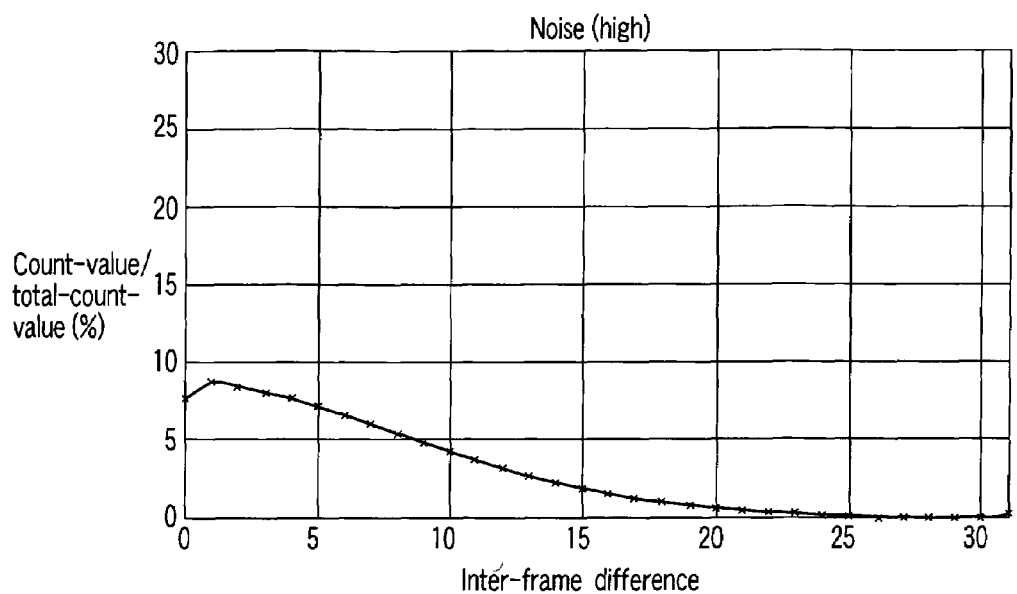
FIG. 4 is an example of a histogram acquired when high-level noise is detected.
Figure 5:
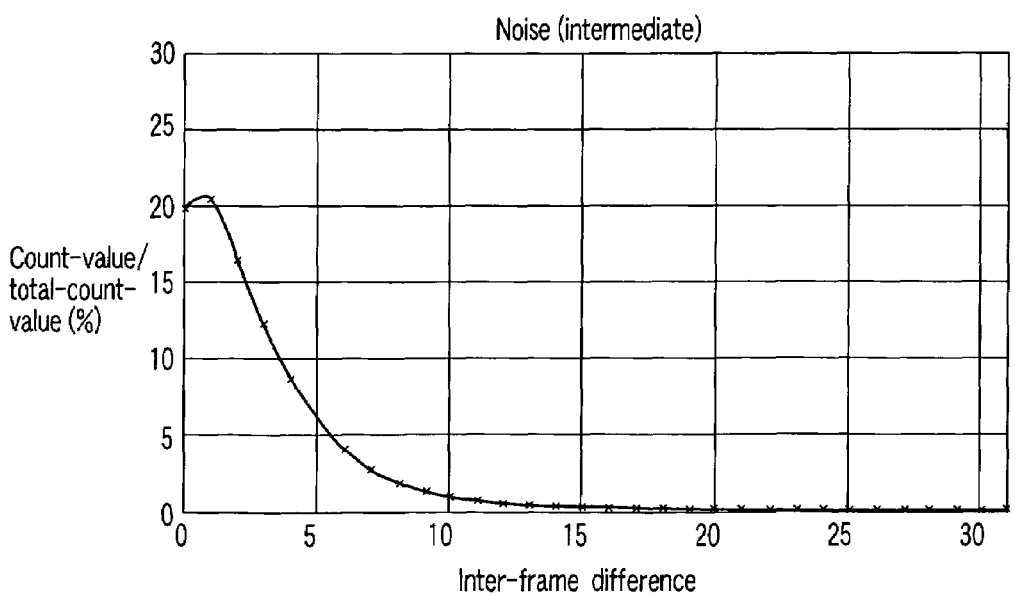
FIG. 5 is an example of a histogram acquired when intermediate-level noise is detected.

FIGS. 4 to 6 are histogram examples generated by the histogram generation circuit 19. In these figures, the abscissa indicates the inter-frame difference level, and the ordinate indicates the normalized count value (i.e., count-value/total-count-value [%]). FIG. 4 shows a case where high-level noise is detected. FIG. 5 shows a case where intermediate-level noise is detected. FIG. 6 shows a case where low-level noise is detected.

The histogram of FIG. 4 (in the case of high-level noise) exhibits a greater standard deviation, variance or mean than that of FIG. 5 (in the case of intermediate-level noise). Further, the histogram of FIG. 6 (in the case of low-level noise) exhibits a smaller standard deviation, variance or mean than that of FIG. 5 (in the case of intermediate-level noise).

For instance, the greater the standard deviation, variance or mean, the greater the noise-amount determination section 25 regards the amount of noise as. Alternatively, the greater the value acquired by the count values concerning the inter-frame difference and exceeding a threshold value, the greater the amount of noise is regarded as.

Figure 7:
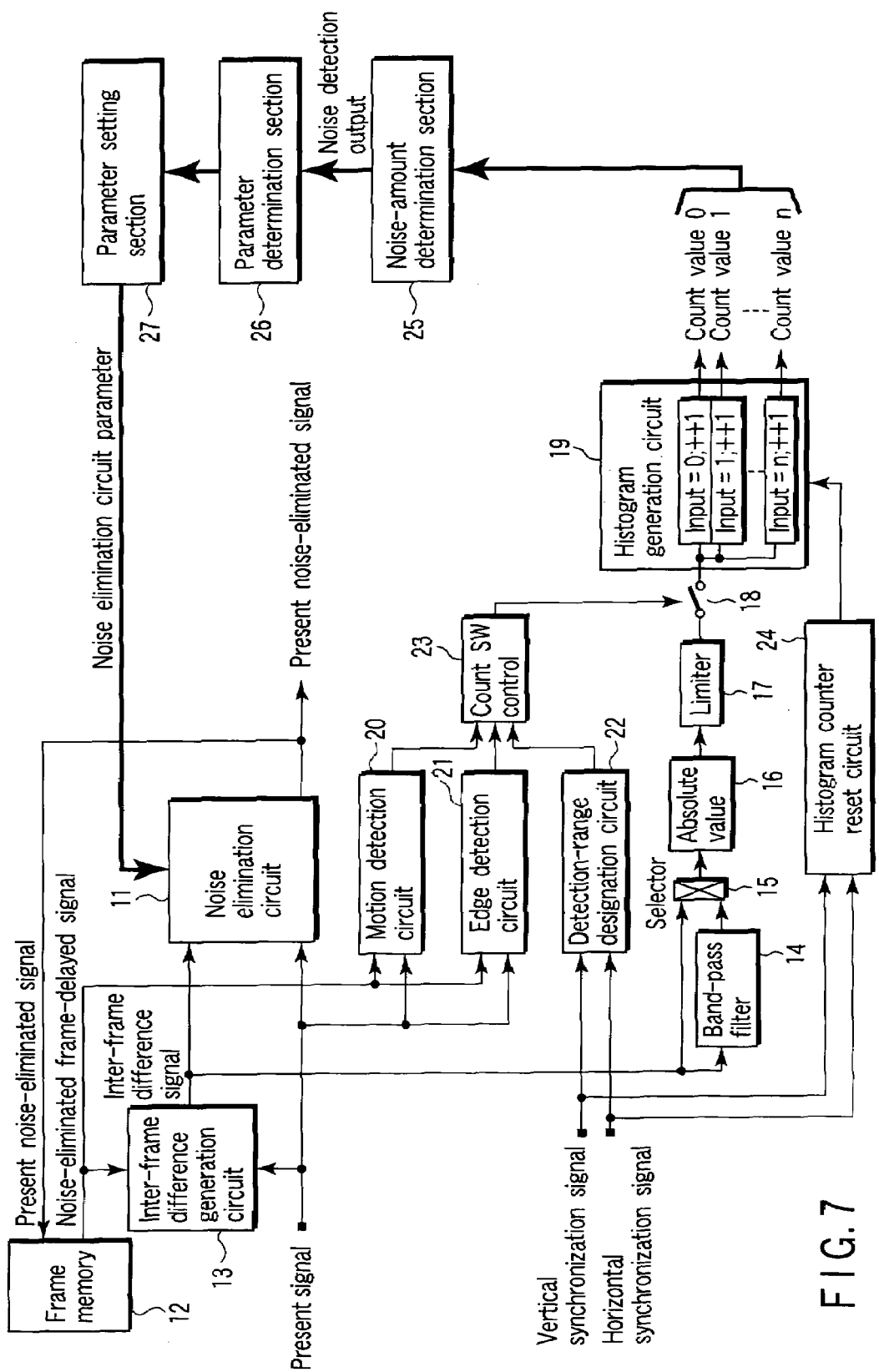
FIG. 7 is a block diagram illustrating an example of a configuration that enables a parameter for a noise elimination circuit to be adjusted based on the amount of noise acquired by the configuration of FIG. 1.

FIG. 7 is a block diagram illustrating an example of a configuration that enables a parameter for the noise elimination circuit 11 to be adjusted based on the amount of noise acquired by the configuration of FIG. 1. In FIG. 7, elements similar to those of FIG. 1 are denoted by corresponding reference numerals, and no detailed description is given thereof.

The configuration of FIG. 7 is acquired by adding a parameter determination section 26 and parameter setting section 27 to the configuration of FIG. 1.

The parameter determination section 26 determines the value of a predetermined parameter (such as a frame circulation coefficient) to be set in the noise elimination circuit 11, based on the amount of noise determined by the noise-amount determination section 25.

The parameter setting section 27 sets, in the noise elimination circuit 11, the parameter value determined by the parameter determination section 26.

By virtue of the above structure, the parameter value in the noise elimination circuit 11 is appropriately adjusted in accordance with the amount of noise determined by the noise-amount determination section 25.

As described above, in the first embodiment, noise that is almost free from the influence of a change in signal level can be detected in noise detection performed on the effective image range of a digital moving picture signal. Further, optimal noise elimination can be realized by adjusting the parameter for the noise elimination circuit using the detection result.

Figure 8:
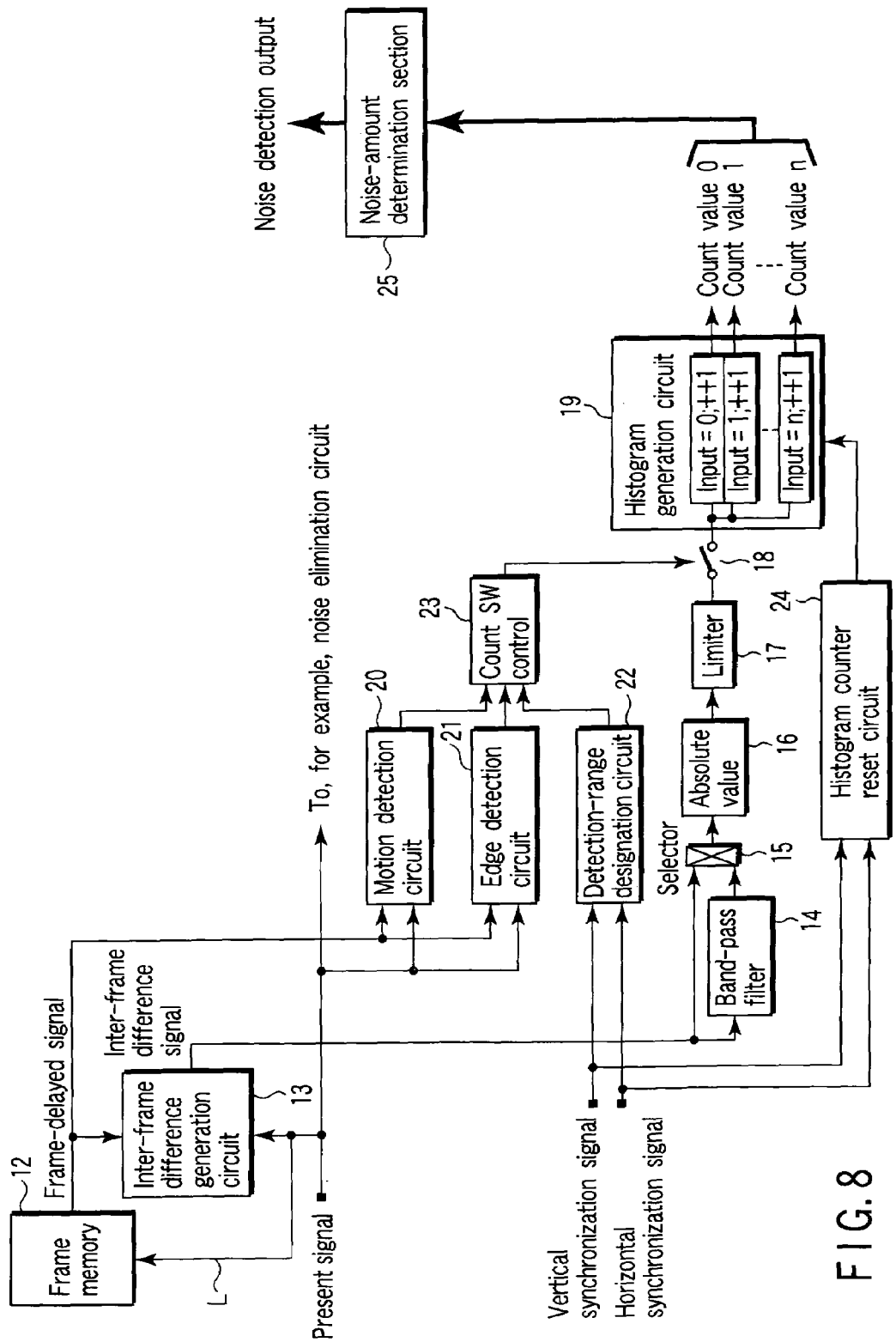
FIG. 8 is a block diagram illustrating the configuration of an image processing apparatus according to a second embodiment of the invention.

FIG. 8 is a block diagram illustrating the configuration of an image processing apparatus according to a second embodiment of the invention. In FIG. 8, elements similar to those of FIG. 1 are denoted by corresponding reference numerals, and no detailed description is given thereof. Only different elements will be described.

In the image processing apparatus of the first embodiment (shown in FIG. 1), the frame memory 12 temporarily stores a present noise-eliminated signal generated by the noise elimination circuit 11, and outputs a noise-eliminated frame-delayed signal acquired by subjecting the signal to a process of delaying the signal by one frame.

In contrast, in the image processing apparatus of the second embodiment shown in FIG. 8, the frame memory 12 temporarily stores a present signal instead of the present noise-eliminated signal, thereby outputting a frame-delayed signal acquired by subjecting the present signal to a process of delaying the signal by one frame. Accordingly, the inter-frame difference generation circuit 13 generates, in units of pixels, an inter-frame difference signal indicating the signal-level difference between frames, based on the present signal of a moving picture, and the frame-delayed signal. Note that the second embodiment may incorporate the noise elimination circuit 11, like the first embodiment. The other structures of the second embodiment are similar to those of the first embodiment.

In the image processing apparatus constructed as above, a frame-delayed signal, which is acquired by delaying by one frame a present signal of a moving picture, is generated, and an inter-frame difference signal is generated based on the present signal and frame-delayed signal. The inter-frame difference signal is subjected to various necessary processes, and then sent as an inter-frame difference histogram input signal to the histogram generation circuit 19. On the other hand, motion detection and edge detection are performed based on the present signal and frame-delayed signal, thereby inhibiting the supply of a signal corresponding to pictures detected by these detection processes to the histogram generation circuit 19. As a result, a histogram is generated with unnecessary components due to, for example, a picture change between frames or pixels eliminated, and hence the amount of noise in the moving picture can be accurately determined.

The configuration of FIG. 8 may incorporate the parameter determination section 26 and parameter setting section 27 shown in FIG. 7.

The second embodiment constructed as above can provide the same advantage as acquired by the first embodiment.

As described above in detail, according to the invention, it is possible to accurately detect noise contained in a moving picture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
   a difference generation section which generates picture differences between frames of a moving picture in units of pixels, based on a present signal of the moving picture and a noise-eliminated frame-delayed signal acquired by subjecting the present signal to a process of eliminating noise and a process of delaying the present signal by one frame;
   a histogram generation section which generates a histogram indicating a level distribution of part of the generated picture differences from which picture differences corresponding to pixels where a picture change not less than a threshold occurs are excluded;
   a motion detection section which detects pixels where a signal-level change between the frames is not less than a certain value; and
   a control section which controls to exclude picture differences corresponding to pixels detected by the motion detection section, from the picture differences generated by the difference generation section.

2. An image processing apparatus, comprising:
   a difference generation section which generates picture differences between frames of a moving picture in units of pixels, based on a present signal of the moving picture and a noise-eliminated frame-delayed signal acquired by subjecting the present signal to a process of eliminating noise and a process of delaying the present signal by one frame;
   a histogram generation section which generates a histogram indicating a level distribution of part of the generated picture differences from which picture differences corresponding to pixels where a picture change not less than a threshold occurs are excluded;
   an edge detection section which detects pixels which have a signal-level difference not less than a certain value with respect to adjacent pixels; and
   a control section which controls to exclude picture differences corresponding to pixels detected by the edge detection section, from the picture differences generated by the difference generation section.

3. An image processing apparatus, comprising:
   a difference generation section which generates picture differences between frames of a moving picture in units of pixels, based on a present signal of the moving picture and a noise-eliminated frame-delayed signal acquired by subjecting the present signal to a process of eliminating noise and a process of delaying the present signal by one frame;
   a histogram generation section which generates a histogram indicating a level distribution of part of the generated picture differences from which picture differences corresponding to pixels where a picture change not less than a threshold occurs are excluded; and
   a noise-amount determination section which determines an amount of noise based on the histogram generated by the histogram generation section.

4. The image processing apparatus according to claim 3, wherein the noise-amount determination section determines the amount of noise, using at least one of a standard deviation, a variance and a mean of the level distribution indicated by the histogram.

5. The image processing apparatus according to claim 3, further comprising a parameter setting section which sets a parameter used for the process of eliminating noise, based on the amount of noise determined by the noise-amount determination section.

6. An image processing method, comprising:
   generating picture differences between frames of a moving picture in units of pixels, based on a present signal of the moving picture and a noise-eliminated frame-delayed signal acquired by subjecting the present signal to a process of eliminating noise and a process of delaying the present signal by one frame;

generating a histogram indicating a level distribution of part of the generated picture differences from which picture differences corresponding to pixels where a picture change not less than a threshold occurs are excluded;

detecting pixels where a signal-level change between the frames is not less than a certain value; and excluding picture differences corresponding to the detected pixels, from the picture differences generated by the picture differences generating.

7. An image processing method, comprising:

generating picture differences between frames of a moving picture in units of pixels, based on a present signal of the moving picture and a noise-eliminated frame-delayed signal acquired by subjecting the present signal to a process of eliminating noise and a process of delaying the present signal by one frame;

generating a histogram indicating a level distribution of part of the generated picture differences from which picture differences corresponding to pixels where a picture change not less than a threshold occurs are excluded;

detecting pixels which have a signal-level difference not less than a certain value with respect to adjacent pixels; and excluding picture differences corresponding to the detected pixels, from the picture differences generated by the picture differences generating.

8. An image processing method, comprising:

generating picture differences between frames of a moving picture in units of pixels, based on a present signal of the moving picture and a noise-eliminated frame-delayed signal acquired by subjecting the present signal to a process of eliminating noise and a process of delaying the present signal by one frame;

generating a histogram indicating a level distribution of part of the generated picture differences from which picture differences corresponding to pixels where a picture change not less than a threshold occurs are excluded; and determining an amount of noise based on the generated histogram.

9. The image processing method according to claim 8, wherein the amount of noise is determined using at least one of a standard deviation, a variance and a mean of the level distribution indicated by the histogram.

10. The image processing method according to claim 8, further comprising setting a parameter used for the process of eliminating noise, based on the determined amount of noise.

* * * * *